(12) United States Patent
Yi et al.

(10) Patent No.: US 10,482,571 B2
(45) Date of Patent: Nov. 19, 2019

(54) DUAL FISHEYE, HEMISPHERICAL IMAGE PROJECTION AND STITCHING METHOD, DEVICE AND COMPUTER-READABLE MEDIUM

(71) Applicants: Hong Yi, Beijing (CN); Weitao Gong, Beijing (CN); Haihua Yu, Beijing (CN); Wei Wang, Beijing (CN)

(72) Inventors: Hong Yi, Beijing (CN); Weitao Gong, Beijing (CN); Haihua Yu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/697,606

(22) Filed: Sep. 7, 2017

(65) Prior Publication Data
US 2018/0114291 A1 Apr. 26, 2018

(30) Foreign Application Priority Data
Oct. 20, 2016 (CN) .......................... 2016 1 0917511

(51) Int. Cl.
*G06T 3/00* (2006.01)
*H04N 5/232* (2006.01)

(52) U.S. Cl.
CPC .......... *G06T 3/0018* (2013.01); *G06T 3/0062* (2013.01); *H04N 5/23238* (2013.01)

(58) Field of Classification Search
CPC .................................................. G06T 3/0018
See application file for complete search history.

(56) References Cited

U.S. PATENT DOCUMENTS 6,002,430 A * 12/1999 McCall .............. H04N 5/23238
348/143
8,854,359 B2 10/2014 Takenaka et al.
(Continued)

FOREIGN PATENT DOCUMENTS

CN 104835117 A * 8/2015

OTHER PUBLICATIONS

R. Szeliski and H. Shum.Creating full view panoramic image mosaics and texturemapped models.Computer Graphics (SIGGRAPH' 97Proceedings), pp. 251-258, Aug. 1997. (Year: 1997).*
(Continued)

*Primary Examiner* — Jamie J Atala
*Assistant Examiner* — Michael Robert Cammarata
(74) *Attorney, Agent, or Firm* — IPUSA, PLLC

(57) ABSTRACT

An image processing method include projecting first and second images which are captured by two fisheye lenses onto first and second hemispherical projection models, respectively; determining a set of waiting-for-stitching surface region pairs on the first and second hemispherical projection models; extracting feature points from the two fisheye images and determining feature points matching each other to serving as pixels matching each other; determining a set of surface region pairs including the pixels matching each other on the first and second hemispherical projection models as the set of waiting-for-stitching surface region pairs; generating a customized projection model on the grounds of the set of waiting-for-stitching surface region pairs by letting a spherical distance between vertexes of each pair in the set of waiting-for-stitching surface region pairs be zero; and generating a third image by projecting the first and second images onto the customized projection model.

11 Claims, 12 Drawing Sheets

(56) References Cited

U.S. PATENT DOCUMENTS

| | | | |
|---|---|---|---|
| 10,339,627 B2* | 7/2019 | Abbas | G06T 3/005 |
| 2015/0178884 A1* | 6/2015 | Scholl | G06T 3/0018 |
| | | | 348/36 |
| 2015/0341557 A1* | 11/2015 | Chapdelaine-Couture | |
| | | | G03B 35/08 |
| | | | 348/38 |
| 2016/0048973 A1* | 2/2016 | Takenaka | G06T 3/4038 |
| | | | 382/199 |
| 2016/0088287 A1* | 3/2016 | Sadi | H04N 13/254 |
| | | | 348/43 |
| 2016/0119541 A1* | 4/2016 | Alvarado-Moya | G06T 3/4038 |
| | | | 348/38 |
| 2016/0353090 A1* | 12/2016 | Esteban | G02B 27/0172 |
| 2017/0019595 A1* | 1/2017 | Chen | H04N 5/23293 |
| 2017/0046820 A1* | 2/2017 | Steel | G06T 3/0018 |
| 2017/0134713 A1* | 5/2017 | Lin | H04N 13/106 |
| 2017/0287107 A1* | 10/2017 | Forutanpour | G06T 3/0062 |
| 2017/0287200 A1* | 10/2017 | Forutanpour | G06T 15/04 |
| 2017/0345136 A1* | 11/2017 | Van der Auwera | G06T 5/006 |
| 2017/0352191 A1* | 12/2017 | Zhou | H04N 5/23238 |
| 2018/0025478 A1* | 1/2018 | Lee | G06T 5/50 |
| | | | 382/284 |

OTHER PUBLICATIONS

Paragios, N., Chen, Y., & Faugeras, O. (2006). Handbook of mathematical models in computer vision. New York: Springer (Year: 2006).*

"Image stitching" [online], Wikipedia, the free encyclopedia, [Searched Sep. 6, 2017], the Internet URL: https://en.wikipedia.org/wiki/Image_stitching.

* cited by examiner

FIG.5A
FIG.5B
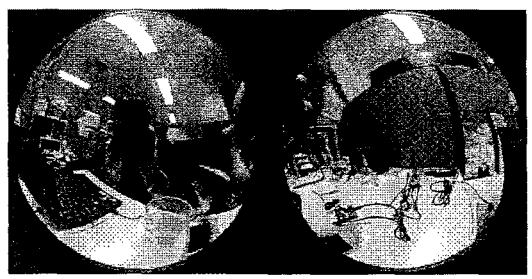
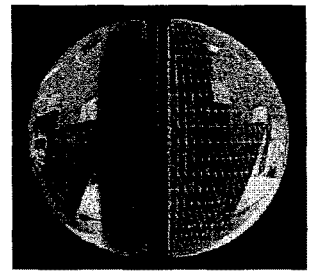
FIG.5C
FIG.5D
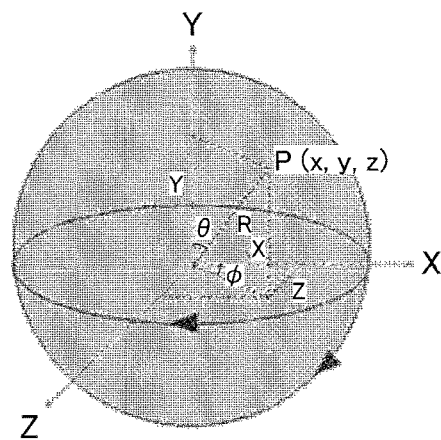
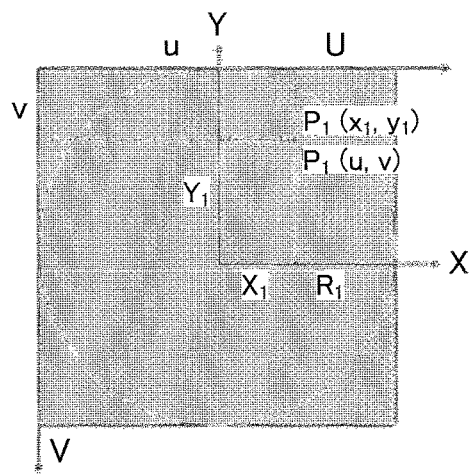
SPHERICAL COORDINATE
SYSTEM
TEXTURE MAP RELATED
COORDINATE SYSTEM

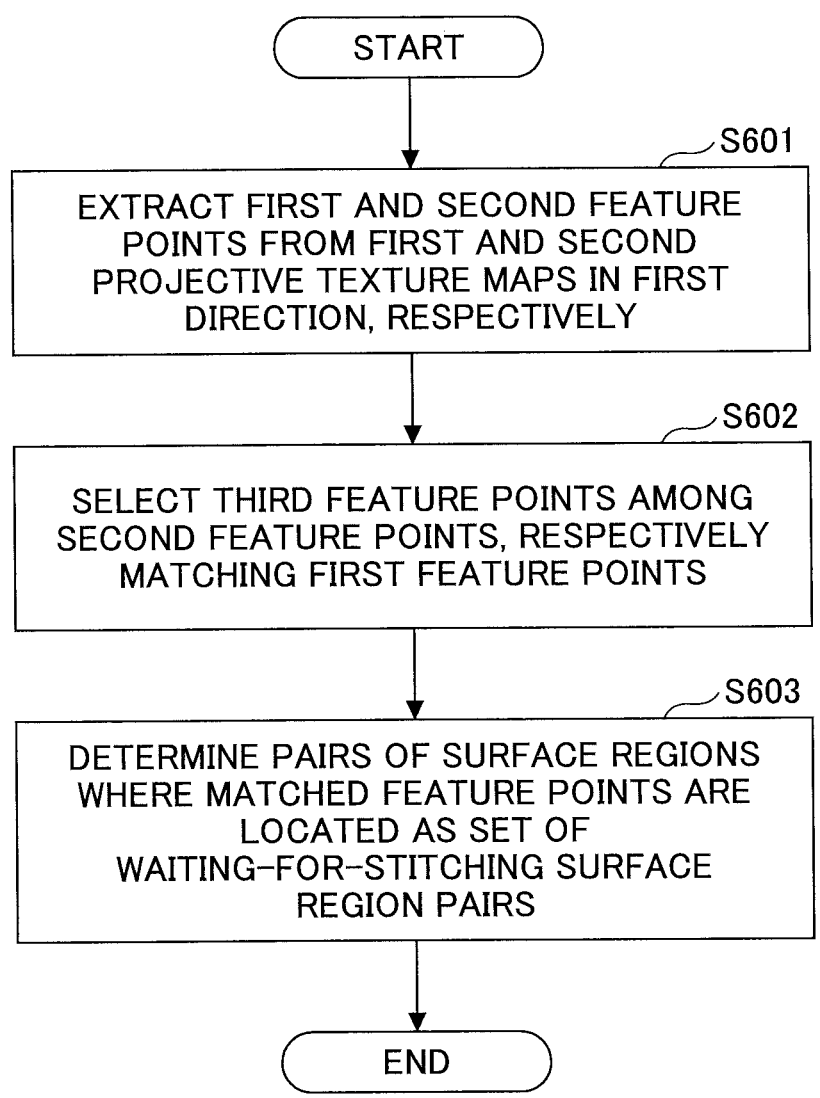

FIG.8
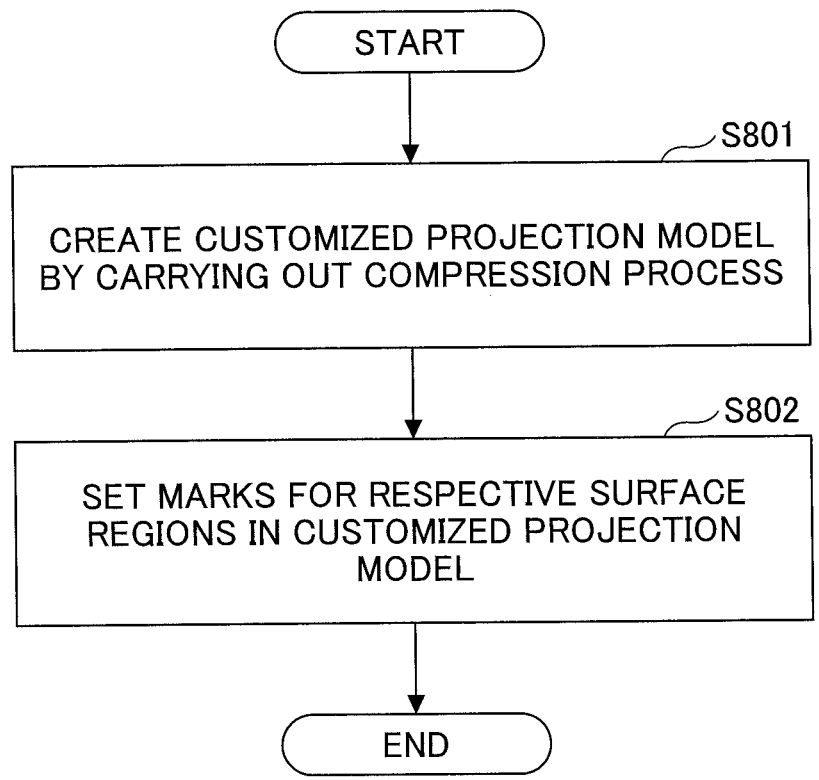
FIG.9A  FIG.9B
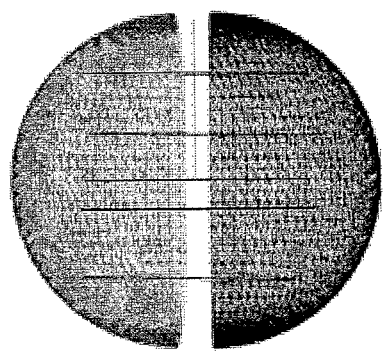 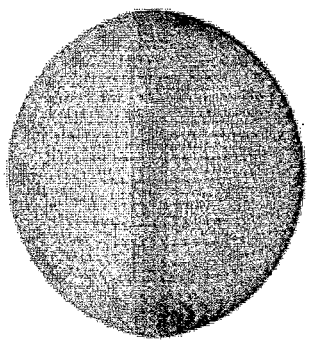

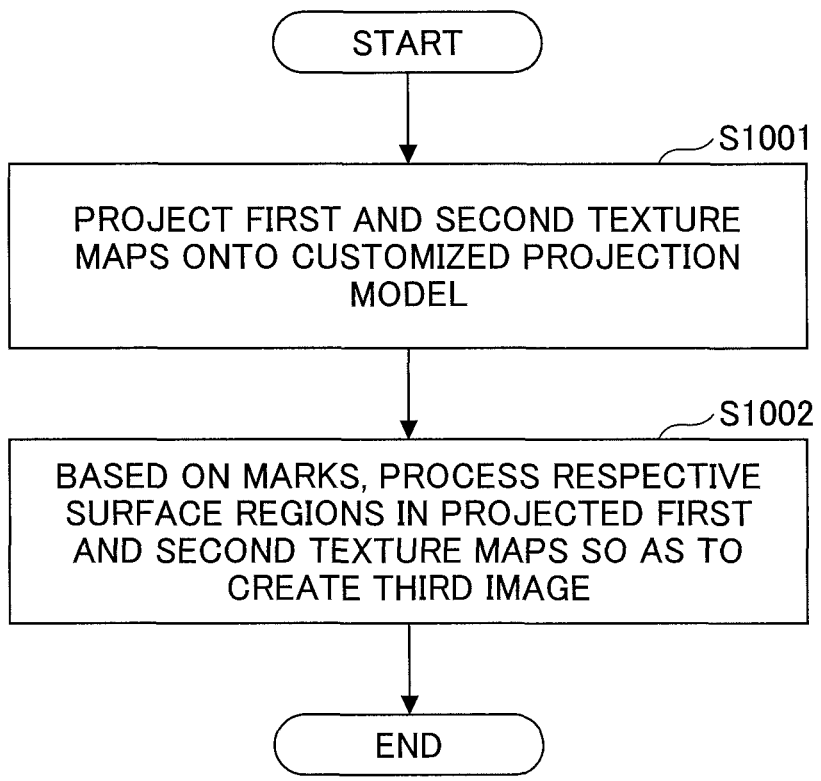
FIG.10
FIG.11A
FIG.11B
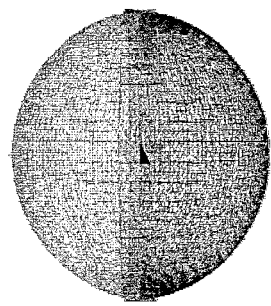

DUAL FISHEYE, HEMISPHERICAL IMAGE PROJECTION AND STITCHING METHOD, DEVICE AND COMPUTER-READABLE MEDIUM

BACKGROUND OF THE DISCLOSURE

1. Field of the Disclosure

The present disclosure relates to the field of image processing, more particularly relates to an image processing method and device based on a customized projection model as well as a non-transitory computer-readable medium.

2. Description of the Related Art

Up to now, a super-wide-angle lens such as a fisheye lens or the like has been utilized to take an omnidirectional panoramic image by way of one-time-only image capture. Generally, a panoramic imaging system may generate a panoramic image by transmitting images coming from a lens to the surface of a sensor and performing image stitching (for more information, see en.wikipedia.org/wiki/Image_stitching) on them. Panoramic projection for creating this kind of panoramic image mainly includes cylindrical projection, cubic projection, spherical projection, etc. Among them, the spherical projection (also called "spherical panorama projection") is widely adopted because it does not have a dead angle and is most similar to the vision system of human beings.

Usually, spherical panorama projection is inclusive of steps of obtaining images by employing one or more lenses; conducting distortion correction with respect to the obtained images; carrying out image matching by means of template matching or feature matching, so as to determine overlapping regions of a part of the obtained images for panoramic image stitching; and projecting the stitched panoramic image onto a spherical surface region. It is obvious that this type of image processing for begetting a spherical panorama projection image needs an image processing device to execute a very complicated procedure. This may be acceptable when conducting static image or video file post-processing. However, in a case of performing spherical panorama projection on a real-time video stream, a well-used image processing device may not afford to repeatedly implement all the steps in regard to each video frame.

As a result, it is preferable to provide an image processing method and an image processing device using the image processing method, by which it is possible to improve the performance of real-time spherical panorama projection so as to achieve the real-time spherical panorama projection of videos.

SUMMARY OF THE DISCLOSURE

In light of the above, the present disclosure provides an image processing method and device based on a customized projection model.

According to a first aspect of the present disclosure, a first image processing method is provided which includes projecting a first image and a second image onto a first hemispherical projection model and a second hemispherical projection model, respectively; determining a set of waiting-for-stitching surface region pairs on the first hemispherical projection model and the second hemispherical projection model; generating a customized projection model based on the set of waiting-for-stitching surface region pairs; and projecting the first image and the second image onto the customized projection model so as to create a third image. The first image and the second image are fisheye images captured in opposite imaging directions from the same position.

According to a second aspect of the present disclosure, an image processing device is provided which includes a projection part configured to project a first image and a second image onto a first hemispherical projection model and a second hemispherical projection model, respectively; a determination part configured to determine a set of waiting-for-stitching surface region pairs on the first hemispherical projection model and the second hemispherical projection model; and a generation part configured to generate a customized projection model based on the set of waiting-for-stitching surface region pairs. The projection part is further configured to project the first image and the second image onto the customized projection model so as to create a third image. The first image and the second image are fisheye images captured in opposite imaging directions from the same position.

According to a third aspect of the present disclosure, a second image processing device is provided which includes a processor and a storage connected to the processor. The storage stores computer-executable instructions for execution by the processor. The computer-executable instructions, when executed, cause the processor to conduct the image processing method depicted above.

According to a fourth aspect of the present disclosure, a panoramic imaging system is provided which includes the first or second image processing device described above.

According to a fifth aspect of the present disclosure, a non-transitory computer-readable medium is provided which stores computer-executable instructions for execution by a processing system. The computer-executable instructions, when executed, cause the processing system to carry out the image processing method set forth above.

As a result, it may be understood that by making use of the above-described image processing method and devices to pre-generate a customized projection model and project fisheye images captured onto the customized projection model, it is not necessary to carry out feature matching and stitching region determination frame by frame (i.e., image by image), so that it is possible to dramatically ameliorate the performance of real-time spherical panorama projection.

BRIEF DESCRIPTION OF THE DRAWINGS

FIGS. 5A to 5D illustrate an exemplary process of projection and its related coordinate conversion in the process of STEP S201 in FIG. 2;

FIG. 6 is a flowchart of the process of STEP S202 in FIG. 2;

FIG. 8 is a flowchart of the process of STEP S203 in FIG. 2;

FIGS. 9A to 9F illustrate an example of generating a customized projection model and setting marks thereon in the process of STEP S203 in FIG. 2;

FIG. 10 is a flowchart of the process of STEP S204 in FIG. 2;

FIGS. 11A to 11D illustrate an example of conducting projection so as to generate a panoramic image in the process of STEP S204 in FIG. 2;

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and the repetition of the explanations to the constructional elements is omitted.

First Embodiment

A panoramic imaging system is given in this embodiment.

Figure 1:
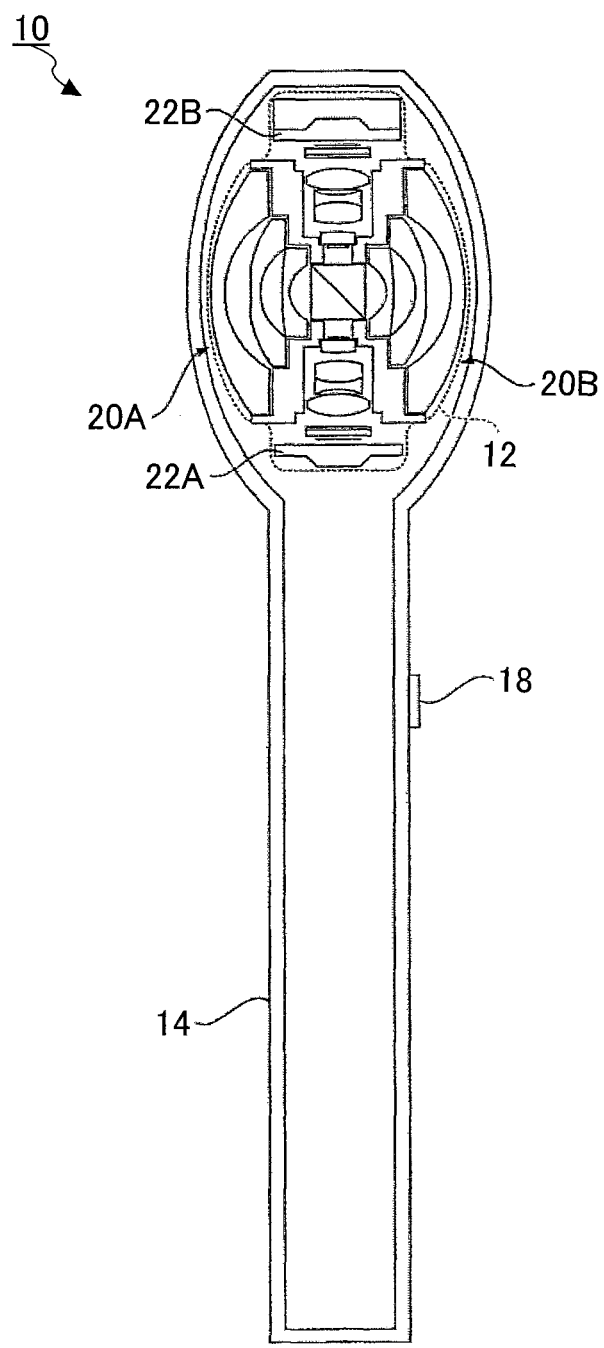
FIG. 1 is a block diagram of a panoramic imaging system according to a first embodiment of the present disclosure.

FIG. 1 is a block diagram of a panoramic imaging system 10 according to this embodiment.

As presented in FIG. 1, the panoramic imaging system 10 contains an imaging unit 12, a casing 14 for accommodating various necessary parts (including the imaging unit 12), and a shutter button 18 provided on the casing 14.

Particularly, the imaging unit 12 includes two optical imaging systems 20A and 20B as well as two image sensors 22A and 22B (e.g., CCD (Charge-Coupled Device) sensors or CMOS (Complementary Metal Oxide Semiconductor) sensors). Each of the optical imaging systems 20A and 20B may be made up of one or more fisheye lenses so as to have a field of view greater than 180° (preferably, greater than 185°).

In this embodiment, the optical imaging systems 20A and 20B have the same specification, and may be combined in the direction opposite to each other by letting their optical axes coincide with each other. The image sensors 22A and 22B are configured to convert the light coming from the optical imaging systems 20A and 20B into image signals, and to output the image signals into an image processing device (not shown in FIG. 1) of the panoramic imaging system 10. The image processing device may be one according to an embodiment of the present disclosure.

Here it should be noted that in the panoramic imaging system 10 as shown in FIG. 1, regarding the optical imaging systems 20A and 20B (i.e., fisheye lenses), they satisfy a condition that their positions are fixed, their optical axes are almost overlapping, and their image planes are substantially parallel. Aside from this, the pixel lines in the fisheye images acquired by the fisheye lenses have been corrected. As such, on the basis of these, an image processing method according to an embodiment of the present disclosure may include pre-creating a customized projection model by performing image stitching on two standard hemispherical models, and then, directly projecting two fisheye images captured in real time onto the customized projection model so as to get a panoramic image.

In what follows, the image processing method and device according to the embodiments of the present disclosure will be minutely described.

Second Embodiment

In this embodiment, an image processing method is provided.

Figure 2:
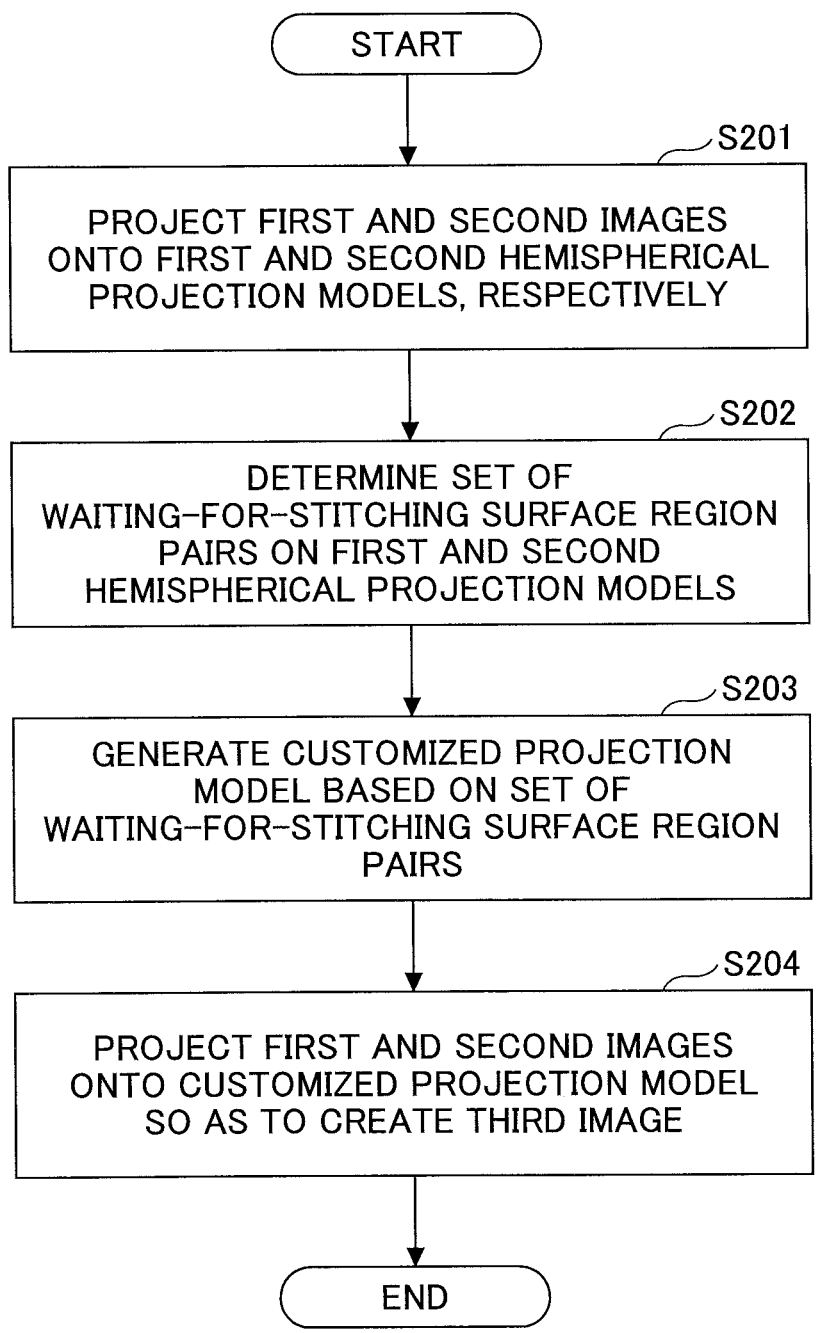
FIG. 2 is a flowchart of an image processing method according to a second embodiment of the present disclosure.

FIG. 2 is a flowchart of the image processing method according to this embodiment.

As presented in FIG. 2, the image processing method is inclusive of STEPS S201 to S204 which are concretely depicted as follows.

In STEP S201 of FIG. 2, first and second images are projected onto first and second hemispherical projection models, respectively. Hereinafter, the process of this step is also called an "first projection process".

In an example, the first and second images are fisheye images which are captured by two fisheye lenses from the same position along opposite imaging directions. The two fisheye lenses meet the above-described condition, i.e., their positions are fixed, their optical axes are almost overlapping, and their image planes substantially parallel.

Here it should be noted that the process of this step, i.e., the first projection process will be described in detail below.

In STEP S202 of FIG. 2, a set of waiting-for-stitching surface region pairs on the first and second hemispherical projection models is determined. Hereinafter, the process of this step is also called a "set determination process".

In an example, first, pixels matching each other in two fisheye images are sought. For instance, it is possible to extract feature points from the two fisheye images and determine some feature points matching each other to serving as the pixels matching each other. Next, a set of surface region pairs including the pixels matching each other on the first and second hemispherical projection models are determined as the set of waiting-for-stitching surface region pairs.

Here it should be noted that the process of this step, i.e., the set determination process will be fully discussed below.

In STEP S203 of FIG. 2, a customized projection model is generated on the grounds of the set of waiting-for-stitching surface region pairs. Hereinafter, the process of this step is also called a "model generation process".

In an example, it is possible to create the customized projection model by letting the spherical distance between the vertexes of each pair in the set of waiting-for-stitching surface region pairs be zero (also called a "compression process"). Additionally, a mark such as "Waiting for Stitching", "Redundant", or "Normal" may also be set for each surface region with predetermined shape (e.g., a triangular shape) and size, of the customized projection model created.

Here it should be noted that the process of this step, i.e., the model generation process will be concretely described below.

In STEP S204 of FIG. 2, by projecting the first and second images onto the customized projection model, a third image (i.e., a panoramic image) is begotten. Hereinafter, the process of this step is also called a "second projection process".

In an example, the third image begotten in this way is a spherical panorama projection image.

Here it should be noted that the process of this step, i.e., the second projection process will be set forth in detail below.

In what follows, the processes of STEP S201 to S204 of FIG. 2 are described minutely.

(1) First Projection Process (STEP S201 of FIG. 2)

Figure 3:
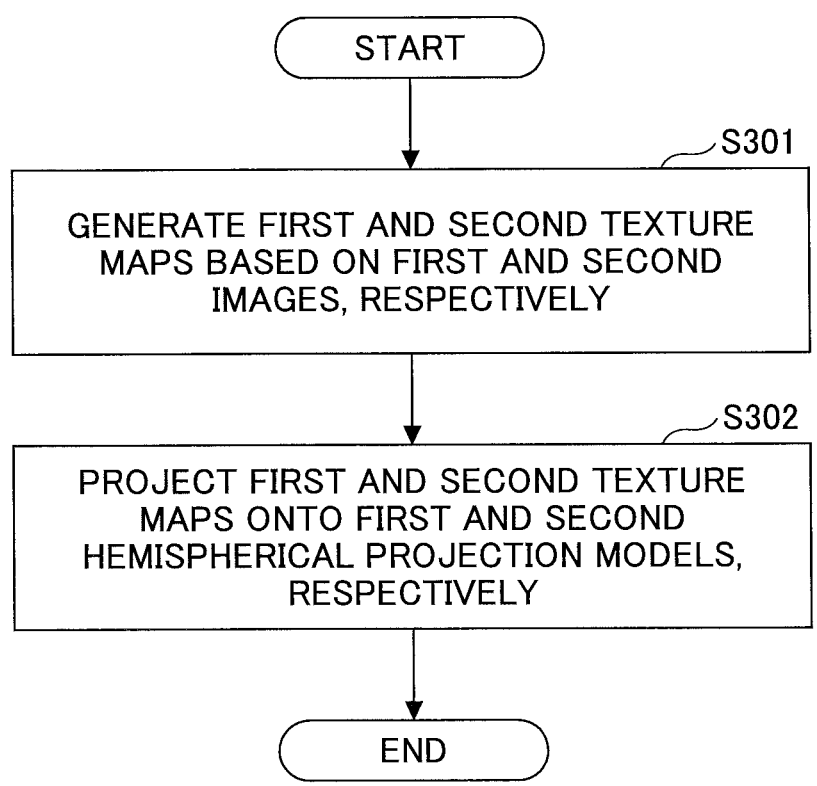
FIG. 3 is a flowchart of the process of STEP S201 in FIG. 2.

FIG. 3 is a flowchart of the first projection process.

Figure 4A:
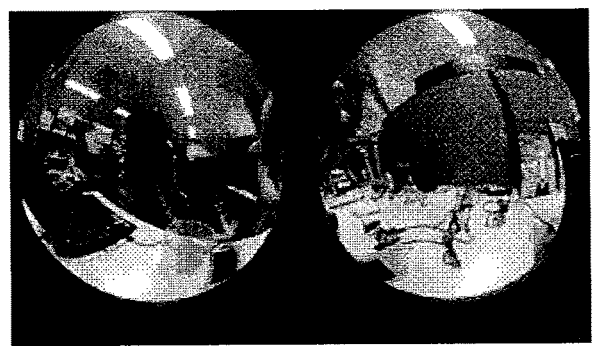
FIGS. 4A to 4C illustrate an example of generating texture maps for projection in the process of STEP S201 in FIG. 2.
Figure 4B:
Figure 4C:
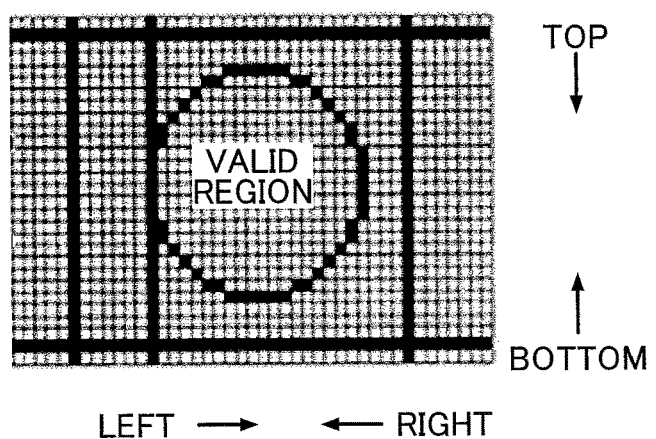

FIGS. 4A to 4C illustrate an example of generating texture maps for projection in the first projection process.

FIGS. 5A to 5D illustrate an exemplary process of projection and its related coordinate conversion in the first projection process.

As presented in FIG. 3, the first projection process contains two steps, i.e., STEPS S301 and S302.

In STEPS S301 of FIG. 3, first and second texture maps are generated on the basis of the first and second images, respectively.

The process of STEP S301 of FIG. 3 is concretely depicted by referring to FIGS. 4A and 4B in the following.

FIG. 4A illustrates two fisheye images (i.e., the first and second images) which may be obtained by the optical imaging systems 20A and 20B of the panoramic imaging system 10 as shown in FIG. 1, for instance. The first and second texture maps may be generated by acquiring two standard circular regions from the two fisheye images, respectively, as shown in FIG. 4B.

In an example, it is possible to adopt a line scanning approach so as to extract a standard circular region from a fisheye image to serve as a texture map. As shown in FIG. 4C, line scanning is performed on a valid region in a fisheye image from the top, bottom, left, and right sides, respectively. In this way, a standard circular region therein may be attained. Here it should be noted that since the line scanning approach is well known in the art, its introduction is omitted for the sake of convenience.

Referring again to FIG. 3; in STEP S302, the first and second texture maps are projected onto the first and second hemispherical projection models so as to obtain first and second projective texture maps, respectively.

In an example, by projecting the first and second texture maps, as shown in FIG. 5A, generated in STEP S301 of FIG. 3 onto the first and second hemispherical projection models, respectively, it is possible to acquire first and second projective texture maps as shown in FIG. 5B. This projection process may utilize a longitude and latitude mapping approach in which coordinate conversion between a fisheye image related coordinate system (i.e., a X-Y coordinate system) and a spherical coordinate system as well as the fisheye image related coordinate system and a texture map related coordinate system (i.e., a U-V coordinate system) is involved.

FIGS. 5C and 5D illustrate the relationships between the spherical coordinate system and the fisheye image related coordinate system as well as the texture map related coordinate system and the fisheye image related coordinate system, respectively.

In the case shown in FIGS. 5C and 5D, the coordinate conversion between the spherical coordinate system and the fisheye image related coordinate system as well as the texture map related coordinate system and the fisheye image related coordinate system may be carried out by way of the following equations (1) to (7).

$$x = R \times \sin\theta \times \cos\phi \quad (1)$$

$$y = R \times \cos\theta \quad (2)$$

$$z = R \times \sin\theta \times \sin\phi \quad (3)$$

$$x_1 = R_1 \times \sin\theta_1 \times \cos\phi_1 \quad (4)$$

$$y_1 = R_1 \times \cos\theta_1 \quad (5)$$

$$u = R_1 \times \sin\theta_1 \times \cos\phi_1 + R_1 \quad (6)$$

$$v = -R^1 \times \cos\theta_1 + R_1 \quad (7)$$

Here, R, $\theta$, and $\phi$ refer to the coordinates of a point P in the spherical coordinate system, and x, y, and Z stand for the coordinates of the point P in the corresponding X-Y-Z coordinate system, as shown in FIG. 5C. The coordinate conversion in regard to the point P between these two coordinate systems may be conducted according to the equations (1) to (3). Moreover, $x_1$ and $y_1$ indicate the coordinates of another point $P_1$ in the fisheye image related coordinate system (i.e., the X-Y coordinate system). According to the equations (1) and (2), the coordinate conversion with respect to the other point $P_1$ between the fisheye image related coordinate system and the spherical coordinate system may be performed based on the equations (4) and (5) in which $R_1$, $\theta_1$, and $\phi_1$ are the coordinates of the other point $P_1$ in the spherical coordinate system. Furthermore, u and v denote the coordinates of the other point $P_1$ in the texture map related coordinate system (i.e., the U-V coordinate system). The coordinate conversion in respect to the other point $P_1$ between the texture map related coordinate system and the fisheye image related coordinate system may be carried out on the grounds of the equations (6) and (7), as shown in FIG. 5D.

(2) Set Determination Process (STEP S202 of FIG. 2)

FIG. 6 is a flowchart of the set determination process.

Figure 7A:
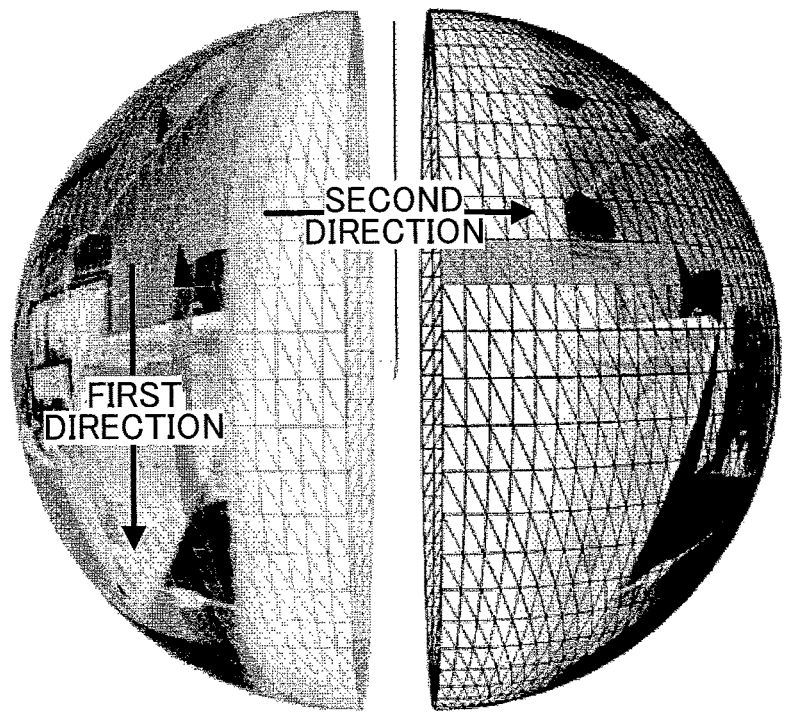
FIGS. 7A to 7C illustrate an example of determining a set of waiting-for-stitching surface region pairs in the process of STEP S202 in FIG. 2.
Figure 7B:
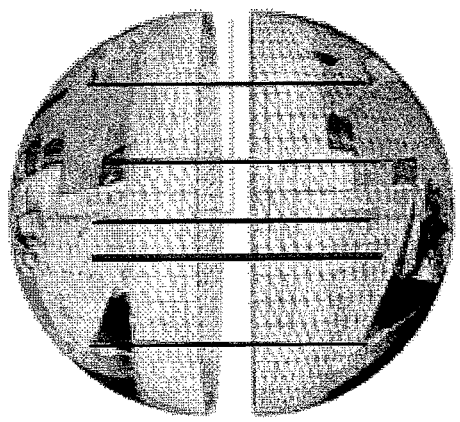
Figure 7C:
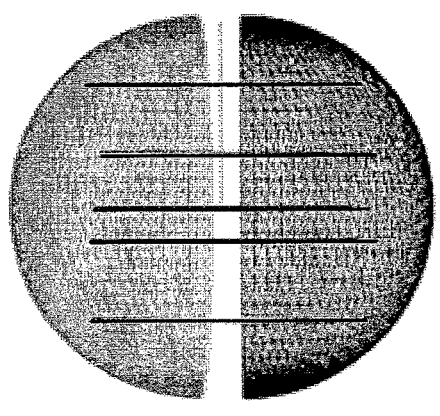

FIGS. 7A to 7C illustrate an example of determining a set of waiting-for-stitching surface region pairs in the set determination process.

As presented in FIG. 6, the set determination process includes three steps, i.e., STEPS S601 to S603 which are minutely depicted with reference to FIGS. 7A to 7C as follows.

In STEP S601 of FIG. 6, first and second feature points are extracted from the first and second projective texture maps in a first direction, respectively, as shown in FIG. 7A.

In an example, the first direction is one along a line of longitude. It is possible to conduct feature point extraction by using, for instance, a SIFT (Scale-Invariant Feature Transform), SURF (Speeded-Up Robust Features) extraction, or ORB (Oriented FAST and rotated BRIEF) detection based algorithm.

Here it should be noted that since the overlapping region of two fisheye images captured by the optical imaging systems 20A and 20B of the panoramic imaging system 10 as shown in FIG. 1 is just a relatively narrow region near the circumferences of the two fisheye images, and because the two fisheye images have been corrected before projection, it is not necessary to carry out feature point extraction and matching with respect the whole spherical surface (e.g., the left and right hemispherical surfaces shown in FIG. 7A). That is, the first and second feature points may be extracted from only the bottoms of the first and second projective texture maps along the first direction, respectively.

In STEP S602 of FIG. 6, as shown in FIG. 7A, in a second direction orthogonal to the first direction, third feature points among the second feature points extracted from the second projective texture map (i.e., the right hemispherical surface in this drawing) are selected which match the first feature points extracted from the first projective texture map (i.e., the left hemispherical surface in this drawing), so as to procure pairs of the first and third feature points.

In an example, the second direction is one along a line of latitude.

Here it should be noted that as set forth above, the optical imaging systems 20A and 20B of the panoramic imaging system 10 as shown in FIG. 1 meet a condition that their positions are fixed, their optical axes are almost overlapping, and their image surface regions are substantially parallel. Thus, two feature points matching each other in the first and second projective texture maps are usually located at the same latitude, as shown in FIGS. 7B and 7C.

In STEP S603 of FIG. 6, pairs of surface regions, where the matched feature points (i.e., the pairs of the first and third feature points) are located, are determined as the set of waiting-for-stitching surface region pairs.

In an example, after acquiring each pair of first and third feature points matching each other in STEP S602 of FIG. 6, it is possible to let a pair of triangular surface regions, where the same pair of first and third feature points are located, in the first and second projective texture maps be a pair of waiting-for-stitching surface regions. In this way, the set of waiting-for-stitching surface region pairs may be determined.

(3) Model Generation Process (STEP S203 of FIG. 2)

FIG. 8 is a flowchart of the model generation process.

FIGS. 9A to 9F illustrate an example of generating a customized projection model and setting marks thereon in the model generation process.

As presented in FIG. 8, the model generation process is inclusive of two steps, i.e., STEPS S801 and S802.

In STEP S801 of FIG. 8, a customized projection model is generated by letting the spherical distance between the vertexes of each pair in the waiting-for-stitching surface region pairs be zero (i.e., a compression process).

The process of STEP S801 of FIG. 8 is minutely described on the grounds of FIGS. 9A to 9E as follows.

By letting the spherical distance between the vertexes of each pair in the waiting-for-stitching surface region pairs as shown in FIG. 9A be zero, it is possible to procure a customized projection model as presented in FIG. 9B.

Figure 9C:
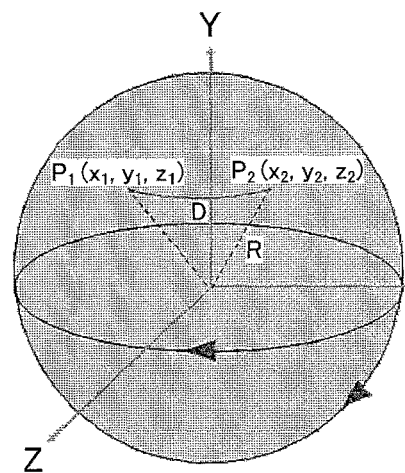
Figure 9D:
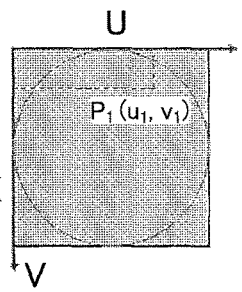
Figure 9E:
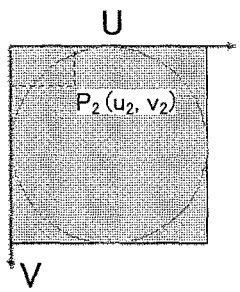

In particular, FIG. 9C illustrates the vertexes $P_1$ and $P_2$ of a pair of waiting-for-stitching surface regions in the spherical coordinate system, whose coordinates in the corresponding X-Y-Z coordinate system are $(x_1, y_1, z_1)$ and $(x_2, y_2, z_2)$. FIGS. 9D and 9E respectively illustrate the coordinates $(u_1, v_1)$ and $(u_2, v_2)$ of the vertexes $P_1$ and $P_2$ in the texture map related coordinate system, which may be derived on the basis of the equations (1) to (7) above, for instance. Here, by satisfying the following equation (8), it is possible to let the spherical distance between the vertexes $P_1$ and $P_2$ be zero.

$$a\cos(\cos(v_1)\cos(v_2)\cos(u_1-u_2)+\sin(v_1)\sin(v_2))=0 \quad (8)$$

In STEP S802 of FIG. 8, for each surface region (e.g., a triangular shape with a predetermined size) in the customized projection model, a mark such as "Waiting for Stitching", "Redundant", or "Normal" is set for this surface region.

Figure 9F:
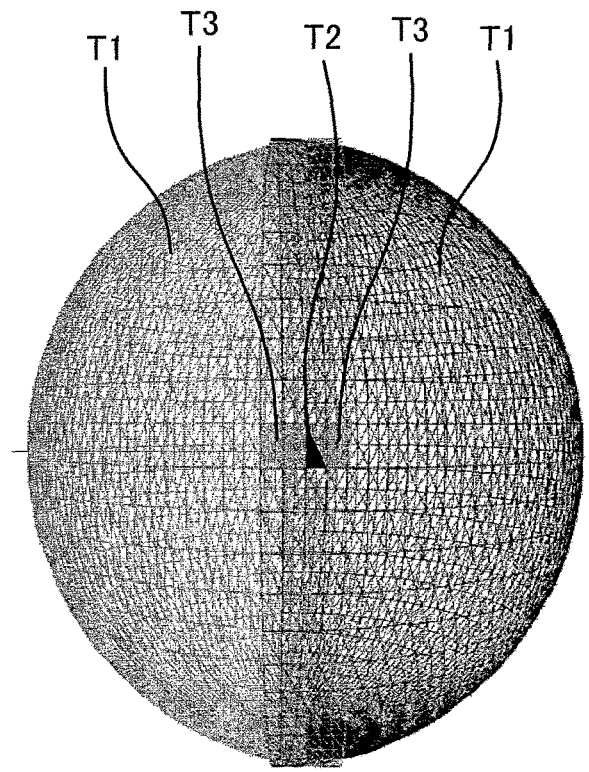

FIG. 9F illustrates some exemplary marks set on a customized projection model obtained after conducting STEP S801 of FIG. 8. As shown in FIG. 9F, on the customized projection model, two triangular surface regions far away from the overlapping region are marked as T1 (standing for "Normal"), and a triangular surface region located within the overlapping region is marked as T2 (referring to "Waiting for Stitching"). However, regarding two triangular surface regions which are located on the original two hemispherical surfaces (i.e., the first and second projective texture maps as presented in FIG. 9A) but outside the customized projection model, they are marked as T3 (indicating "Redundant").

(4) Second Projection Process (STEP S204 of FIG. 2)

FIG. 10 is a flowchart of the second projection process.

FIGS. 11A to 11D illustrate an example of conducting projection so as to generate a third image in the second projection process.

As shown in FIG. 10, the second projection process has two steps, i.e., STEPS S1001 and S1002.

In STEP S1001 of FIG. 10, the first and second texture maps are projected onto the customized projection model.

In STEP S1002 of FIG. 10, the respective surface regions in the projected first and second texture maps are processed on the basis of the marks set for the customized projection model, so as to create a third image (i.e., a panoramic image).

In an example, each surface region in the projected first or second texture map corresponding to a surface region marked as T1 in the customized projection model does not need to be processed. Any two surface regions respectively being in the projected first and second texture maps with respect to a surface region marked as T2 in the customized projection model may be merged according to weights given to the first and second texture maps in advance. And the transparency of each surface region in the projected first or second texture map corresponding to a surface region marked as T3 in the customized projection model may be directly set to zero.

Figure 11C:
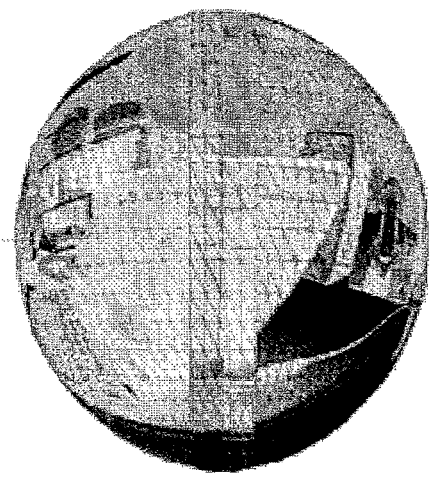
Figure 11D:
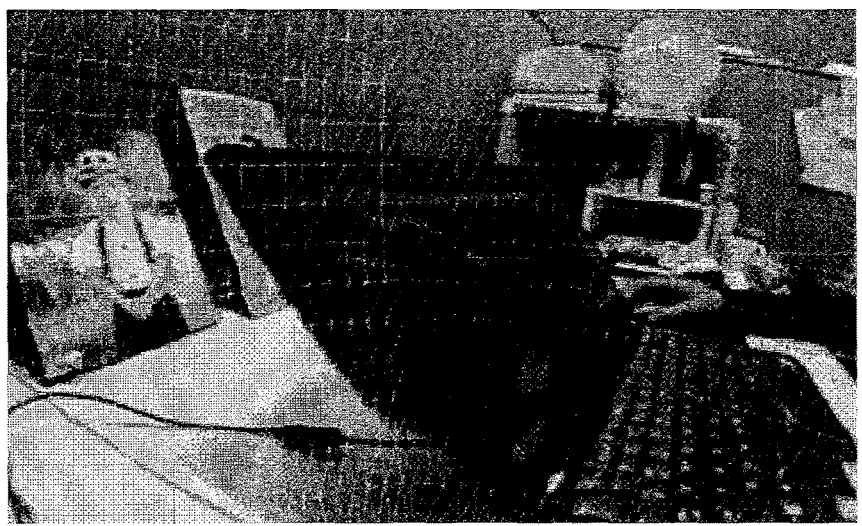

Here it should be noted that FIG. 11A illustrates the first and second texture maps. FIG. 11B illustrates the relevant customized projection model. FIG. 11C illustrates a result gained by projecting the first and second texture maps shown in FIG. 11A onto the relevant customized projection model presented in FIG. 11B, And FIG. 11D illustrates the overall effect of an image (i.e., a panoramic image) attained after processing the projected first and second texture maps shown in FIG. 11C on the basis of the marks set for the relevant customized projection model.

As a result, it may be understood that by utilizing the image processing method according to this embodiment to pre-create a customized projection model and project fisheye images obtained onto the customized projection model, it is not necessary to conduct feature matching and stitching region determination frame by frame (i.e., image by image), so that it is possible to greatly improve the performance of real-time spherical panorama projection.

Third Embodiment

An image processing device is given in this embodiment.

Figure 12:
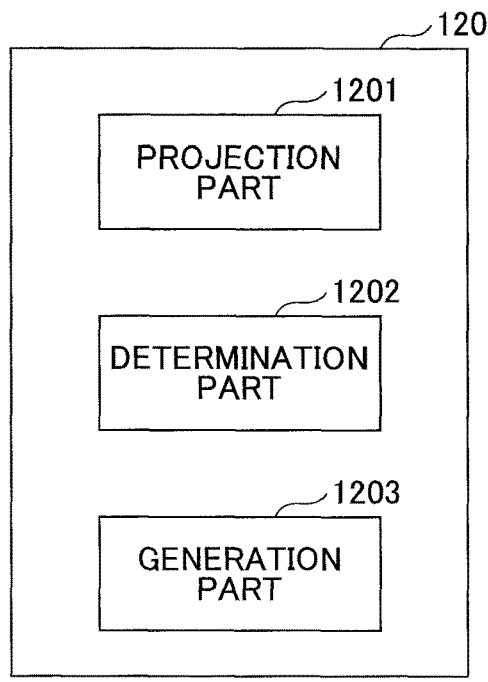
FIG. 12 is a block diagram of an image processing device according to a third embodiment of the present disclosure.

FIG. 12 is a block diagram of an image processing device 120 according to this embodiment, which may be configured in the panoramic imaging system 10 according to the first embodiment.

As presented in FIG. 12, the image processing device 120 includes a projection part 1201, a determination part 1202, and a generation part 1203. Aside from these parts, the image processing device 120 may further contain other parts which are not closely relating to this embodiment, of course.

The projection part 1201 is configured to respectively project first and second images onto first and second hemispherical projection models, namely, conduct STEP S201 of FIG. 2.

The determination part 1202 is configured to determine a set of waiting-for-stitching surface region pairs on the first and second hemispherical projection models, namely, execute STEP S202 of FIG. 2.

The generation part 1203 is configured to generate a customized projection model on the basis of the set of waiting-for-stitching surface region pairs, namely, perform STEP S203 of FIG. 2.

In addition, the projection is further configured to project the first and second images onto the customized projection model so as to beget a third image (i.e., a panoramic image).

Here it should be noted that the concrete descriptions of STEPS S201 to S204 of FIG. 2 are omitted for the sake of convenience because they have been detailed in the second embodiment.

Fourth Embodiment

In this embodiment, another image processing device is provided.

Figure 13:
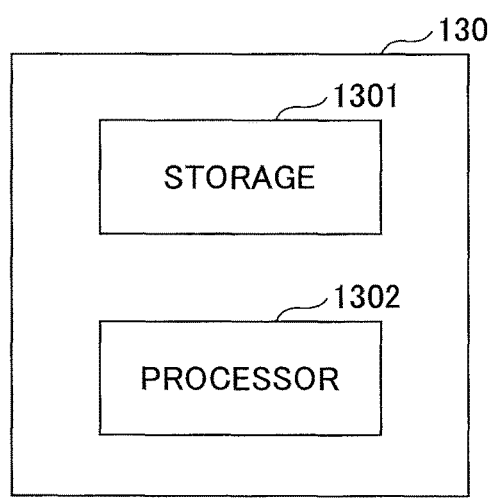
FIG. 13 is a block diagram of another image processing device according to a fourth embodiment of the present disclosure.

FIG. 13 is a block diagram of an image processing device 130 according to this embodiment.

As illustrated in FIG. 13, the image processing device 130 contains a storage 1301 and a processor 1302. Of course, it is apparent that other parts may also be included in the image processing device 130 as needed.

The storage 1301 and the processor 1302 (e.g., a central processing unit) may be connected via a bus. The storage 1301 may be configured to store computer-executable instructions (i.e. an application program) for execution by the processor 1302 and intermediate data during a calculation process of the processor 1302. The computer-executable instructions, when executed, may cause the processor 1110 to carry out the image processing method according to the second embodiment. Here it should be noted that the processor 1302 may include one or more processor, or may be a processing system.

As a result, it may be understood that by taking advantage of the image processing devices according to these two embodiments to pre-generate a customized projection model and project fisheye images acquired onto the customized projection model, it is not necessary to perform feature matching and stitching region determination frame by frame (i.e., image by image), so that it is possible to significantly ameliorate the performance of real-time spherical panorama projection.

Here it should be noted that the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 201610917511.9 filed on Oct. 20, 2016, the entire contents of which are hereby incorporated by reference.

What is claimed is:

1. An image processing method comprising:
   projecting a first image and a second image onto a first hemispherical projection model and a second hemispherical projection model, respectively;
   determining a set of waiting-for-stitching surface region pairs on the first hemispherical projection model and the second hemispherical projection model;
   preliminarily generating a customized spherical projection model by stitching the first hemispherical projection model and the second hemispherical projection model along the set of waiting-for-stitching surface region pairs; and
   projecting the first image and the second image that are acquired as a real time video stream directly onto the preliminarily customized spherical projection model so as to create a third image without conducting image stitching,
   wherein, the first image and the second image are fisheye images captured in opposite imaging directions from a same position.

2. The image processing method according to claim 1, wherein, the projecting a first image and a second image onto a first hemispherical projection model and a second hemispherical projection model, respectively includes
   generating a first texture map and a second texture map based on the first image and the second image, respectively; and
   projecting the first texture map and the second texture map onto the first hemispherical projection model and the second hemispherical projection model so as to obtain a first projective texture map and a second projective texture map, respectively.

3. The image processing method according to claim 2, wherein, the determining a set of waiting-for-stitching surface region pairs on the first hemispherical projection model and the second hemispherical projection model includes
   extracting, in a first direction, first feature points and second feature points from the first projective texture map and the second projective texture map, respectively;
   selecting, in a second direction orthogonal to the first direction, third feature points among the second feature points extracted from the second projective texture map, which respectively match the first feature points extracted from the first projective texture map, so as to acquire pairs of the first feature points and the third feature points;

determining pairs of surface regions, where the pairs of the first feature points and the third feature points are located, on the first hemispherical projection model and the second hemispherical projection model as the set of waiting-for-stitching surface region pairs.

4. The image processing method according to claim 3, wherein, the generating a customized projection model based on the set of waiting-for-stitching surface region pairs includes letting a spherical distance between vertexes of each pair in the set of waiting-for-stitching surface region pairs be zero so as to create the customized projection model; and setting marks for respective surface regions in the customized projection model.

5. The image processing method according to claim 4, wherein, the projecting the first image and the second image onto the customized projection model so as to create a third image includes projecting the first texture map and the second texture map onto the customized projection model; and processing, based on the marks, respective surface regions in the first texture map and the second texture map projected, so as to create the third image.

6. A non-transitory computer-readable medium having computer-executable instructions for execution by a processing system, wherein, the computer-executable instructions, when executed, cause the processing system to carry out the image processing method according to claim 1.

7. An image processing device comprising:

a projector configured to project a first image and a second image onto a first hemispherical projection model and a second hemispherical projection model, respectively; and a processor configured to:
  determine a set of waiting-for-stitching surface region pairs on the first hemispherical projection model and the second hemispherical projection model; and
  preliminarily generate a customized spherical projection model by stitching the first hemispherical projection model and the second hemispherical projection model along the set of waiting-for-stitching surface region pairs, wherein, the projector is further configured to project the first image and the second image that are acquired as a real time video stream directly onto the preliminarily customized spherical projection model so as to create a third image without conducting image stitching, and the first image and the second image are fisheye images captured in opposite imaging directions from a same position.

8. The image processing device according to claim 7, wherein, the projector is configured to generate a first texture map and a second texture map based on the first image and the second image, respectively; and project the first texture map and the second texture map onto the first hemispherical projection model and the second hemispherical projection model so as to obtain a first projective texture map and a second projective texture map, respectively.

9. The image processing device according to claim 8, wherein, the processor is configured to extract, in a first direction, first feature points and second feature points from the first projective texture map and the second projective texture map, respectively;

select, in a second direction orthogonal to the first direction, third feature points among the second feature points extracted from the second projective texture map, which respectively match the first feature points extracted from the first projective texture map, so as to acquire pairs of the first feature points and the third feature points;

determine pairs of surface regions, where the pairs of the first feature points and the third feature points are located, on the first hemispherical projection model and the second hemispherical projection model as the set of waiting-for-stitching surface region pairs.

10. The image processing device according to claim 9, wherein, the processor is configured to let a spherical distance between vertexes of each pair in the set of waiting-for-stitching surface region pairs be zero so as to create the customized projection model; and set marks for respective surface regions in the customized projection model.

11. The image processing device according to claim 10, wherein, the projector is configured to project the first texture map and the second texture map onto the customized projection model; and processing, based on the marks, respective surface regions in the first texture map and the second texture map projected, so as to create the third image.

* * * * *